July 27, 1965 H. HEITMANN ETAL 3,197,567
CIRCUIT ARRANGEMENT FOR PABX-SYSTEMS
Filed March 5, 1962
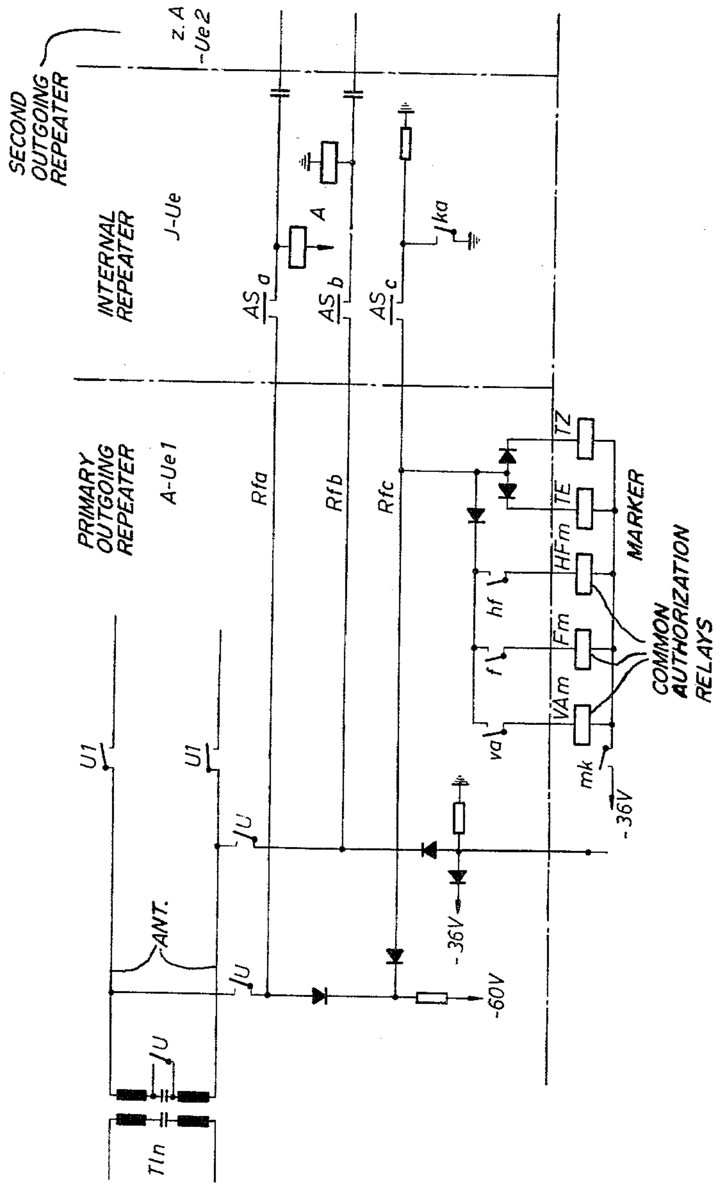
INVENTOR
H. Heitmann
H. Aumuller
BY [signature]
ATTORNEY United States Patent Office 3,197,567
Patented July 27, 1965

3,197,567

CIRCUIT ARRANGEMENT FOR PABX-SYSTEMS

Herbert Heitmann, Stuttgart-Feuerbach, and Hans Aumüller, Besigheim, Wurttemberg, Germany, assignors to International Standard Electric Corporation, New York, N.Y., a corporation of Delaware Filed Mar. 5, 1962, Ser. No. 177,354
Claims priority, application Germany, Mar. 7, 1961, St 17,543
3 Claims. (Cl. 179—18)

This invention relates to a circuit arrangement for private automatic branch exchange telephone systems in which it is possible to perform a call back enquiry via a second outgoing repeater, more particularly to an arrangement for distinguishing between the different authorizations of subscribers (i.e. between restricted or limited service subscribers and unrestricted or full service subscribers).

The arrangement according to the invention provides a possibility of maintaining the authorization (restriction) of the respective subscriber seizing the first outgoing repeater also in cases where the call back enquiry (request call) is made via a second outgoing repeater. In this way subscribers are prevented from obtaining a different authorization upon seizing another or second outgoing repeater in order to make an attempt at conducting local or trunk calls to which, normally, they would not be entitled.

Among the subscribers of a PABX-system authorized to seize an outgoing repeater, the system must distinguish between those who are entitled to exchange local calls, regional calls, and long-distance or trunk calls. An indication of the respective subscriber's authorization is stored in the seized outgoing repeater in accordance with the manner in which various terminals are wired together in the subscriber's circuit.

An object of the present invention is to provide an arrangement for transferring the authorization, as stored in a first or primarily seized outgoing repeater to a second outgoing repeater which is seized in the course of the call back enquiry. Therefore, the subscriber is able to establish only the connections to which he is actually entitled in accordance with his authorization.

In the arrangement according to the invention, this is accomplished in that a signal indicating the class of the calling subscriber is stored in the primarily seized outgoing repeater upon starting of a local call. The same class signal is transferred to an internal repeater which is seized in the course of a call back enquiry (request call). This is accomplished by common authorization relays so that during the marking of the second outgoing repeater, the previously set authorization is transferred to this particular repeater. Most appropriately the common authorization relays are incorporated in the marker serving this particular outgoing repeater.

According to a further embodiment of the invention, the corresponding authorization relay is energized in the marker—in the course of starting a local call—via the particular *c*-wire (test wire) of the internal repeater that has been connected to the call back enquiry outlet of the primarily seized outgoing repeater. Thereupon, and as already mentioned, the authorization criterion is taken over by the second outgoing repeater and during the process of marking this repeater, via the marker.

In the following, the invention will now be explained in detail with reference to the accompanying drawing.

The drawing shows a two-wire telephone transmission line terminated at one end in a transformer T1*n* and at the other end in a trunk line A*mt*. Dot-dashed lines separate the drawing into a first trunk or repeater circuit A–U*e*1, an internal repeater circuit J–U*e*, and a second trunk or repeater circuit z.A–U*e*2. The circuits A–U*e*1 and A–U*e*2 are identical. The horizontal dot-dashed line separates the equipment (above the line) which is individually associated with each call for the duration thereof and the common equipment (below the line) which is shared by all of the individual equipment in the exchange.

The subscriber line circuit (not shown) contains jumpers which are permanently installed on class of service terminals to mark the associated subscriber line as either authorized to receive some services or restricted from receiving other services. These jumpers cause relay operations which (in any well-known manner) selectively close contacts *va*, *f*, or *hf* in the repeater circuit A–U*e*1. These contacts, in turn, control a number of class of service relays VA*m*, F*m*, HF*m* in the common control circuit, which is below the horizontal dot-dashed line. Each of these class of service relays can close contacts which either authorize or restrict the kinds of service which may be given to the subscriber.

As those familiary with private branch exchanges know, one class of subscribers is authorized to and another class of subscribers is restricted from making certain types of calls. For example, some subscribers may dial "9" to seize a trunk line leading to a main exchange, while other subscribers who dial "9" can get only a busy tone. Hence, we could assume that an operation of relay HF*m* allows access to the trunk, and its non-operation prevents access.

Sometimes, during a call, it is necessary for a conversing subscriber to call another subscriber, either to transfer the call to that other subscriber (as when a receptionist answers all incoming calls) or to secure information from that other subscriber. For example, if the subscriber dials "7," the equipment A–U*e*1 seizes an internal repeater J–U*e* which is equipped to extend the call to the other subscriber in any suitable manner.

Suppose, however, that the subscriber wishes to complete a fraudulent call. For example, the subscriber is restricted from dialing "9" and seizing the trunk line A*mt*. Therefore, he dials a number required to seize repeater A–U*e*1 (where relay HF*m* fails to operate because he is restricted from making trunk calls); then, he dials "7" to seize the internal repeater J–U*e*. However, instead of dialing the directory number of another subscriber, he again dials "9" to seize another trunk circuit z.A–U*e*2. If the restricted service marking is not repeated from circuit A–U*e*1 through circuit J–U*e* to circuit z.A–U*e*2, a fraudulent trunk call will be completed. This kind of fraud cannot be tolerated.

In greater detail, the subscriber line extends to a well-known line circuit (not shown) then through any suitable switching equipment to the transformer T1*n*. The subscriber dials to seize one of many outgoing repeater circuits. If the outgoing repeater A–U*e*1 is the first one to be seized, then a signal indicating the subscriber's class of service is transferred from the respective subscriber's circuit to the outgoing repeater. If the subscriber is entitled to exchange local calls, then an authorization relay VA (not shown) will operate in a not shown but well-known manner in the outgoing repeater A–U*e*1. Via the contact *va* this class of service authorization signal is preparatorily applied to the common authorization relay VA*m* of the marker. If the subscriber is entitled to exchange regional or even long-distance (trunk) calls, there will be obtained in a similar way the preparation for either the common authorization relay HF*m* or F*m*.

For initiating a call back enquiry (request call) on the outgoing repeater A–U*e*1, it is necessary to actuate the contacts *u*. Via the not shown starting circuit the next successive idle internal repeater J–U*e* is seized in the known manner. The call back enquiry outlet of the outgoing repeater A–U*e* is blocked via the *c*-wire of the seized internal repeater. The potential on the *c*-wire of the call back enquiry line R*fc*, however, is still so negative that the preparatorily applied common authorization relay in the marker is not yet capable of operating. After the subscriber has caused a code-number starting on the primarily seized outgoing repeater A–U*e*1 with a view of seizing a second outgoing repeater, there will be effected the closing of the contact *ka* of the internal repeater. In this way there is not only initiated the starting of a local call, but also the corresponding common authorization relay in the marker is operated, because the contact *mk* of the marker is closed since there is effected the seizing and the marking of the second outgoing repeater A–U*e*2. The corresponding authorization relay is then energized in the outgoing repeater A–U*e*2 in a similar way as via the subscriber's circuits, namely via the contacts of the aforementioned authorization relay that has been energized in the marker. In this way the subscriber engaged on a call back enquiry (request call) will obtain the same authorization (restriction) as the subscriber seizing the first outgoing repeater.

This arrangement does not impose any service limitations or restrictions upon the subscribers, also not when making a call back enquiry via secondary junctions, and makes sure that no unauthorized calls are made by subscribers via this possible secondary path.

While we have described above the principles of our invention in connection with specific apparatus, it is to be clearly understood that this description is made only by way of example and not as a limitation to the scope of our invention as set forth in the objects thereof and in the accompanying claims.

What is claimed is:

1. A private branch exchange automatic telephone system comprising a subscriber line which is given a particular class of service, a plurality of outgoing trunk circuits individually associated with outgoing calls for the duration thereof, an internal repeater circuit for transferring calls within said exchange, means responsive to signals from a subscriber line for seizing one of said trunk circuits and for storing signals indicating the class of service given to a conversing subscriber line, means responsive to switch directing signals received from said conversing subscribers for further extending said call, means responsive to predetermined switch directing signals for seizing said internal repeater circuit, and means for thereafter forwarding said class of service signal from said one trunk circuit through said internal repeater circuit to the next succeeding circuit.

2. The exchange of claim 1 and common control equipment shared by the equipment in said exchange, and means for storing the class of service indication in the common control equipment.

3. The exchange of claim 1 wherein said class of service indication is first stored in said one trunk circuit during the establishment of a local call, said trunk circuits and said internal repeater being interconnected via a three-wire circuit, including two talking wires and a control wire.

References Cited by the Examiner

UNITED STATES PATENTS

| | | | |
|---|---|---|---|
| 1,744,696 | 1/30 | Friendly | 179—18 |
| 2,124,913 | 7/38 | Engel | 179—18 |
| 2,358,185 | 9/44 | Pearce et al. | 179—18 |
| 2,586,534 | 2/52 | Gray | 179—18 |

ROBERT H. ROSE, *Primary Examiner.*

WALTER L. LYNDE, *Examiner.*